United States Patent
Reddy

(10) Patent No.: US 12,511,140 B2
(45) Date of Patent: Dec. 30, 2025

(54) PERFORMANCE CONTROLLER FOR MACHINE LEARNING BASED DIGITAL ASSISTANT

(71) Applicant: SAP SE, Walldorf (DE)

(72) Inventor: Srinivasa Byaiah Ramachandra Reddy, Bangalore (IN)

(73) Assignee: SAP SE, Walldorf (DE)

(*) Notice: Subject to any disclaimer, the term of this patent is extended or adjusted under 35 U.S.C. 154(b) by 616 days.

(21) Appl. No.: 18/059,366

(22) Filed: Nov. 28, 2022

(65) Prior Publication Data

US 2024/0176629 A1    May 30, 2024

(51) Int. Cl.
  *G06F 9/451*  (2018.01)
  *G06F 40/279* (2020.01)
  *G06F 40/35*  (2020.01)
  *G06N 20/20*  (2019.01)

(52) U.S. Cl.
  CPC ............ *G06F 9/453* (2018.02); *G06F 40/279* (2020.01); *G06F 40/35* (2020.01); *G06N 20/20* (2019.01)

(58) Field of Classification Search
  None
  See application file for complete search history.

(56) References Cited

U.S. PATENT DOCUMENTS

| | | | | |
|---|---|---|---|---|
| 10,909,442 | B1* | 2/2021 | Szarvas | G06N 3/08 |
| 11,842,158 | B2* | 12/2023 | Schreiber | G06F 3/14 |
| 11,977,836 | B1* | 5/2024 | Archambeau | G06F 40/279 |
| 11,983,777 | B1* | 5/2024 | Metzger | G06Q 40/08 |
| 2019/0378210 | A1* | 12/2019 | Merrill | G06N 5/01 |
| 2021/0097433 | A1* | 4/2021 | Olgiati | G06F 11/0793 |
| 2022/0229991 | A1* | 7/2022 | Duong | G06F 40/289 |
| 2022/0309295 | A1* | 9/2022 | Wang | G06T 7/0012 |

* cited by examiner

*Primary Examiner* — Maikhanh Nguyen
(74) *Attorney, Agent, or Firm* — Mintz Levin Cohn Ferris Glovsky and Popeo, P.C.

(57) ABSTRACT

A method may include training, based at least on a first data, a machine learning model to perform one or more natural language processing tasks. The trained machine learning model may be deployed to a production environment to support natural language based interactions with a digital assistant. A plurality of performance metrics may be generated to include explanation data associated with the deployed machine learning model operating on a second data as well as one or more data characteristics of the second data such as data drift, data bias, and outliers. A user interface may be generated to display, at a client device, a visual representation of at least a portion of the plurality of performance metrics associated with the deployed machine learning model. Related methods and computer program products are also disclosed.

15 Claims, 9 Drawing Sheets

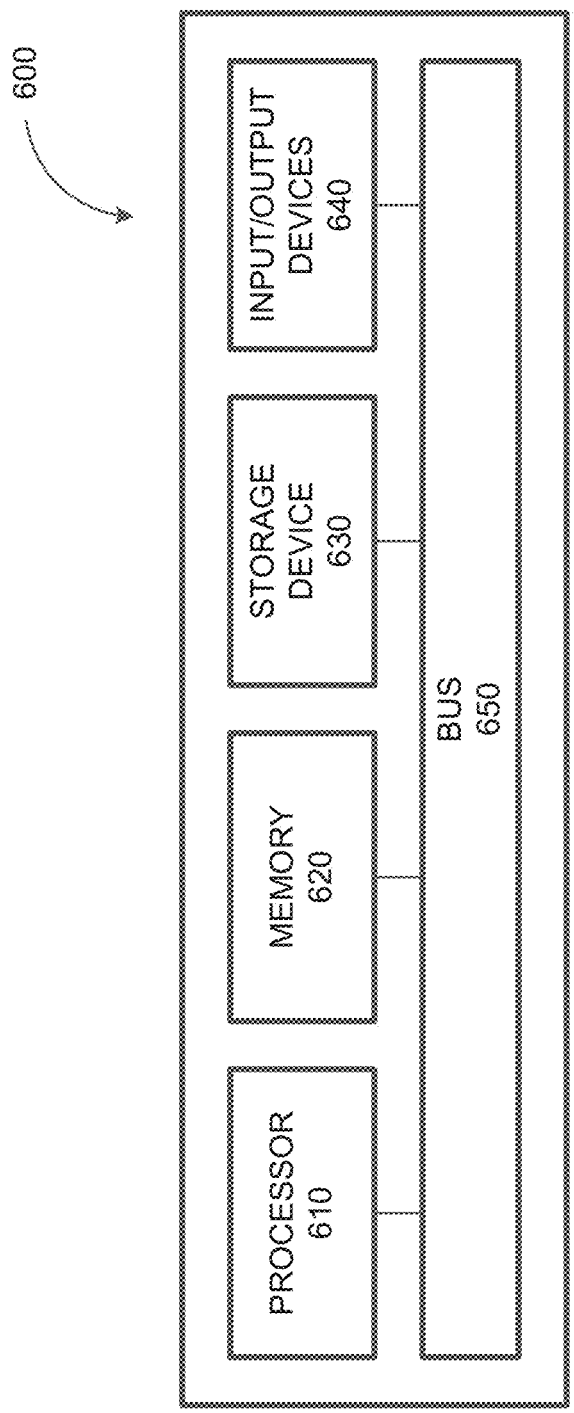

PERFORMANCE CONTROLLER FOR MACHINE LEARNING BASED DIGITAL ASSISTANT

FIELD

The present disclosure generally relates to machine learning and more specifically to a performance controller for machine learning based digital assistant with microservices for model explainability and detection of data bias, data drift, and outliers.

BACKGROUND

Enterprise software applications may support a variety of enterprise workflows including, for example, billing, invoicing, procurement, payroll, time and attendance management, recruiting and onboarding, learning and development, performance and compensation, workforce planning, and/or the like. In some cases, user interactions with an enterprise software application may be conducted via a conversation simulation application (e.g., a chatbot and/or the like). Accordingly, one or more data processing functionalities of the enterprise software application may be invoked using natural language commands. In some cases, instead of being a text input, the natural language commands may be voice commands received via a voice based user interface. For example, the conversation simulation application may receive a natural language command invoking an enterprise workflow associated with an enterprise software application, such as assigning a source of supply within an enterprise resource planning (ERP) application, that requires performing a sequence of operations. Alternatively and/or additionally, an enterprise resource planning (ERP) system may include an issue tracking system configured to generate a ticket in response to an error reported via one or more telephone calls, emails, short messaging service (SMS) messages, social media posts, web chats, and/or the like.

SUMMARY

Methods, systems, and articles of manufacture, including computer program products, are provided for a performance controller for a machine learning based digital assistant. In one aspect, there is provided a system. The system may include at least one data processor and at least one memory. The at least one memory may store instructions that result in operations when executed by the at least one data processor. The operations may include: training, based at least on a first data, a machine learning model to perform one or more natural language processing tasks; deploying, to a production environment, the trained machine learning model to support natural language based interactions with a digital assistant; generating a plurality of performance metrics to include explanation data associated with the deployed machine learning model operating on a second data, the explanation data being generated by applying a plurality of explanation models and ensembling an output of each of the plurality of explanation models; and generating a user interface to display, at a client device, a visual representation of at least a portion of the plurality of performance metrics associated with the deployed machine learning model.

In another aspect, there is provided a method for a performance controller for a machine learning based digital assistant. The method may include: training, based at least on a first data, a machine learning model to perform one or more natural language processing tasks; deploying, to a production environment, the trained machine learning model to support natural language based interactions with a digital assistant; generating a plurality of performance metrics to include explanation data associated with the deployed machine learning model operating on a second data, the explanation data being generated by applying a plurality of explanation models and ensembling an output of each of the plurality of explanation models; and generating a user interface to display, at a client device, a visual representation of at least a portion of the plurality of performance metrics associated with the deployed machine learning model.

In another aspect, there is provided a computer program product that includes a non-transitory computer readable storage medium. The non-transitory computer-readable storage medium may include program code that causes operations when executed by at least one data processor. The operations may include: training, based at least on a first data, a machine learning model to perform one or more natural language processing tasks; deploying, to a production environment, the trained machine learning model to support natural language based interactions with a digital assistant; generating a plurality of performance metrics to include explanation data associated with the deployed machine learning model operating on a second data, the explanation data being generated by applying a plurality of explanation models and ensembling an output of each of the plurality of explanation models; and generating a user interface to display, at a client device, a visual representation of at least a portion of the plurality of performance metrics associated with the deployed machine learning model.

In some variations of the methods, systems, and computer program products, one or more of the following features can optionally be included in any feasible combination.

In some variations, the plurality of explanation models may include an integrated gradients explanation model, an anchors explanation model, and/or a similarity explanation model.

In some variations, the output of each of the plurality of explanation models may be ensembled by applying one or more of a bagging ensembling technique, a stacking ensembling technique, and a boosting ensembling technique.

In some variations, the plurality of performance metrics may be generated to include one or more data characteristics of the second data.

In some variations, the one or more data characteristics may include a data bias in which the first data and/or the second data exhibits a bias towards one or more classes.

In some variations, the one or more data characteristics may include a data drift in which the second data deviates from the first data.

In some variations, the one or more data characteristics may include at least one outlier in which the second data falls outside of a distribution of the first data.

In some variations, the one or more natural language processing tasks may include entity recognition, intent classification, and skill resolution and execution.

In some variations, the trained machine learning model may be deployed to process one or more natural language commands received by the digital assistant.

In some variations, the one or more natural language commands may invoke at least one data processing functionality of an enterprise software application associated with the digital assistant.

In some variations, the at least one data processing functionality may be associated with at least one enterprise workflow comprising billing, invoicing, procurement, payroll, time and attendance management, recruiting and onboarding, learning and development, performance and compensation, and/or workforce planning.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a digital assistant with natural language processing capabilities, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6 depicts a block diagram illustrating an example of a computing system, in accordance with some example embodiments.

Figure 1:
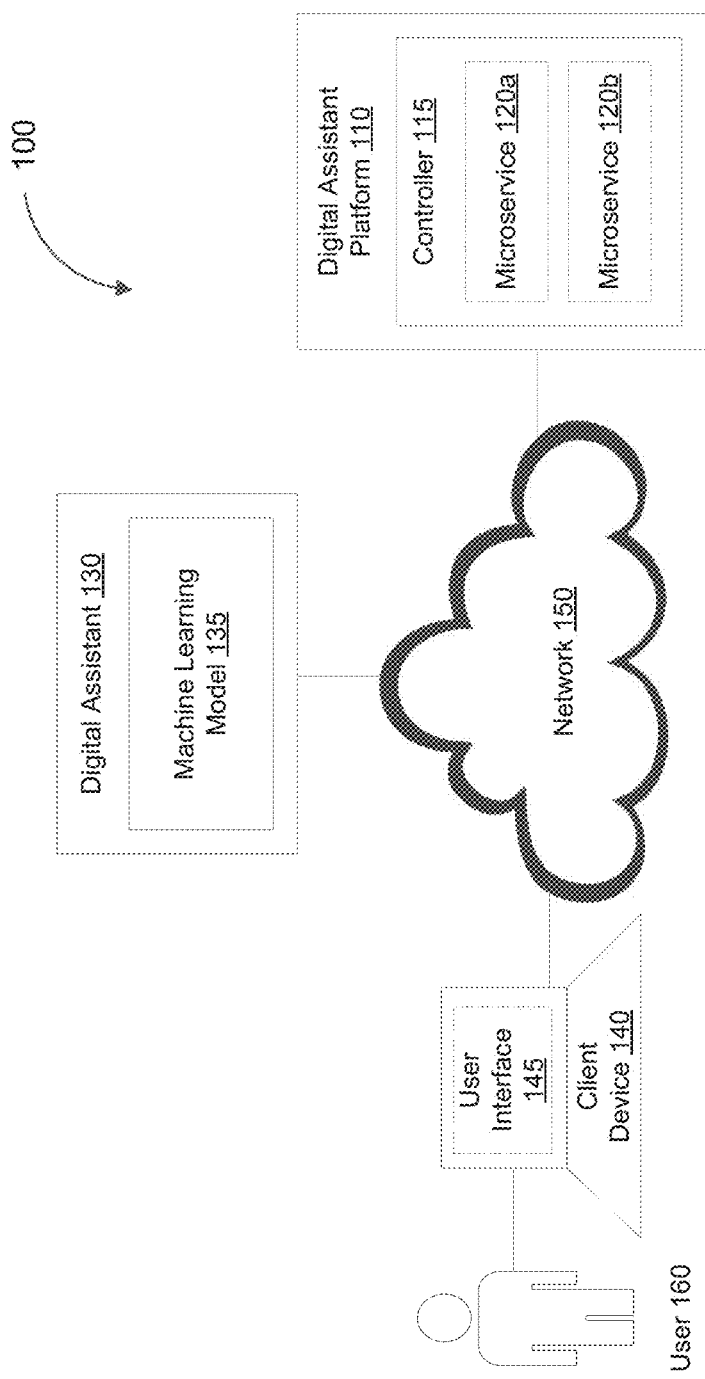
FIG. 1 depicts a system diagram illustrating a digital assistant system, in accordance with some example embodiments.

When practical, like labels are used to refer to same or similar items in the drawings.

DETAILED DESCRIPTION

A digital assistant (or chatbot) may include a machine learning enabled conversation simulation application to support natural language based interaction with a variety of software applications including enterprise software applications for billing, invoicing, procurement, payroll, time and attendance management, recruiting and onboarding, learning and development, performance and compensation, workforce planning, and/or the like. A corresponding digital assistant platform may provide lifecycle management for various digital assistants including by supporting a variety of end-to-end workflows, for example, to build, deploy, and manage individual digital assistants. A conventional lifecycle management workflow for a digital assistant may include designing the digital assistant, training the underlying machine learning models (e.g., to perform one or more domain-specific natural language processing tasks such as entity recognition, intent classification, and skill resolution and execution), and deploying the digital assistant to a production environment. The conventional lifecycle management workflow for the digital assistant ceases upon deployment. That is, once the digital assistant is deployed to the production environment, the digital assistant platform lends no visibility to how the digital assistant is performing in its production environment. As such, the digital assistant platform is unable to provide any insights to when the digital assistant is performing poorly or when the performance of the digital assistant degrades over time.

In some example embodiments, a digital assistant platform may include a performance controller configured to provide variety of microservices to monitor the performance of a digital assistant deployed in its production environment. For example, in some cases, the performance controller may provide a microservice for model interpretability or explainability, which may include identifying a top k quantity of variables contributing to an output of the underlying machine learning models performing one or more domain-specific natural language processing tasks such as entity recognition, intent classification, and skill resolution and execution. Alternatively and/or additionally, the performance controller may provide a microservice for detecting, in a first data encountered by the machine learning models during development (e.g., training, validation, and testing) and/or a second data encountered by the machine learning models in deployment, one or more data characteristics associated with an impact to the performance of the machine learning models. Examples of such data characteristics may include data bias, data drift, and outliers.

FIG. 1 depicts a system diagram illustrating an example of a digital assistant system 100, in accordance with some example embodiments. Referring to FIG. 1, the digital assistant system 100 may include a digital assistant platform 110, a digital assistant 130, and one or more client devices 140 communicatively coupled via a network 150. The one or more client devices 140 may be processor-based devices including, for example, a smartphone, a tablet computer, a wearable apparatus, a virtual assistant, an Internet-of-Things (IOT) appliance, and/or the like. The network 150 may be a wired network and/or a wireless network including, for example, a wide area network (WAN), a local area network (LAN), a virtual local area network (VLAN), a public land mobile network (PLMN), the Internet, and/or the like.

In some example embodiments, the digital assistant platform 110 may support an end-to-end lifecycle management workflow to develop, deploy, and manage the digital assistant 130. In some cases, the digital assistant 130 may be embedded in one or more enterprise software applications 145 supporting, for example, billing, invoicing, procurement, payroll, time and attendance management, recruiting and onboarding, learning and development, performance and compensation, workforce planning, and/or the like. For example, in some cases, the digital assistant 130 may include a machine learning model 135 trained to support natural language based interactions with the one or more enterprise software applications 145. In some cases, the machine learning model 135 may be trained to perform domain-specific natural language processing tasks including, for example, entity recognition, intent classification, skill resolution and execution, and/or the like. As such, a user 160 at the client device 140 may interact with the one or more enterprise software applications 145 via one or more natural language commands provided as text inputs, voice commands, and/or the like. In this context, various entities (e.g., purchase order, leave requests, compensation review, and/or the like) may be defined with a fixed set of values or following a dynamic pattern or regular expressions (e.g., #action: {get, update, delete} entity). Intent classification may include modelling the intent associated with a natural language expression including one or more entities (e.g., name, time, purchase order, and/or the like). Each skill may be defined as a combination of intents, entities, conditions, and actions to be taken. For example, if intent #purchase_order is present and @po_number is present and @action is get, the skill may be to call a backend system or an external application programming interface (API) to fetch the status of the purchase order.

In some example embodiments, the digital assistant platform 110 may support an end-to-end lifecycle management workflow that includes training the machine learning model 135 to perform a variety of natural language processing tasks including, for example, entity recognition, intent classification, skill resolution and execution, and/or the like. Moreover, in some example embodiments, the digital assistant platform 110 may support an end-to-end lifecycle management workflow that includes performance monitoring in the form of model explainability and detection of data bias, data drift, and outliers. For instance, in the example shown in FIG. 1, the digital assistant platform 110 may include a performance controller 115 configured to provide one or more microservices 120. In some cases, the performance controller 115 may provide a first microservice 120a with one or more explanation models providing various model interpretability or explainability data, which may include identifying a top k quantity of variables contributing to an output of the machine learning model 135 performing one or more domain-specific natural language processing tasks such as entity recognition, intent classification, and skill resolution and execution. Alternatively and/or additionally, the performance controller 115 may provide a second microservice 120b for detecting, in a first data encountered by the machine learning model 135 during development (e.g., training, validation, and testing) and/or a second data encountered by the machine learning model 135 in deployment, one or more data characteristics associated with an impact to the performance of the machine learning models. Examples of such data characteristics may include data bias (e.g., a bias towards certain classes in the first data and/or the second data), data drift (e.g., the second data deviating from the first data), and outliers (e.g., the second data falling outside of the distribution of the first data).

Figure 2A:
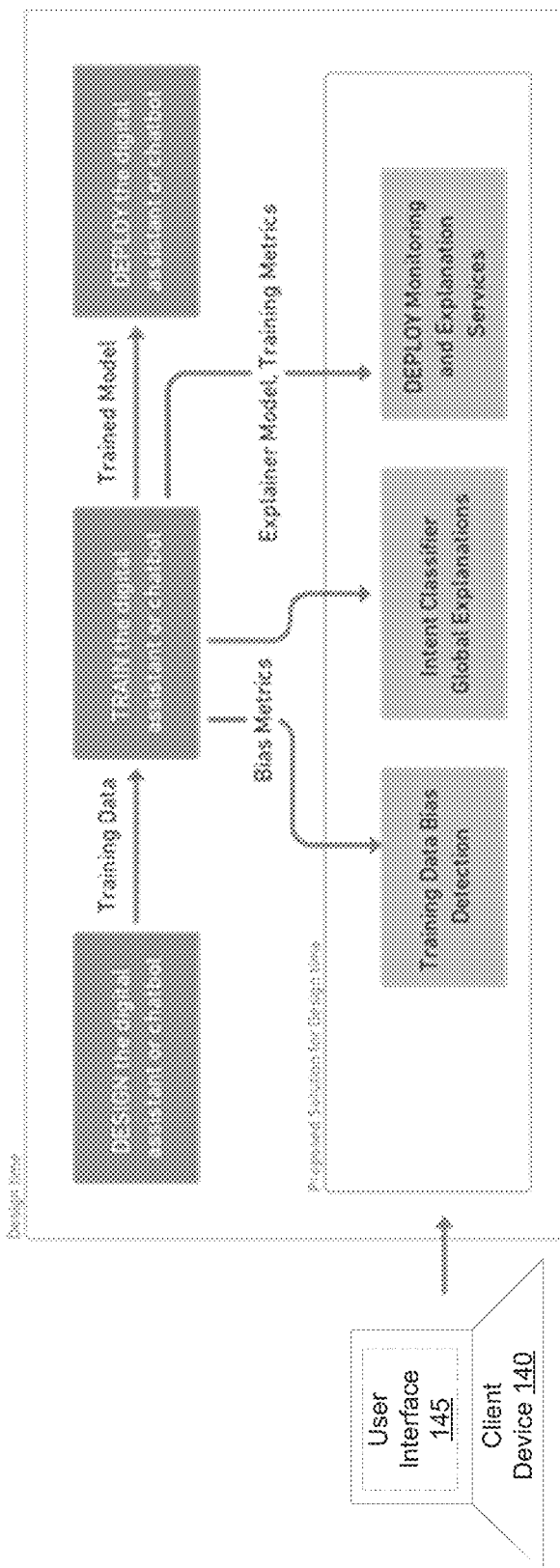
FIG. 2A depicts a schematic diagram illustrating an example of a digital assistant lifecycle management workflow, in accordance with some example embodiments.

FIG. 2A depicts a schematic diagram illustrating an example of a digital assistant lifecycle management workflow 250, in accordance with some example embodiments. In some example embodiments, during the training of the machine learning model 135, the first microservice 120a at the performance controller 115 may apply one or more explanation (or explainer) models to generate one or more model explanations 175 for the training data used to train the machine learning model 135. The model explanations 175 may be stored, for example, in a data store 170. For example, in some cases, the data store 170 may be an object store in which the one or more model explanations 175 are stored along with an identifier of a corresponding training dataset and training dataset version.

Figure 3:
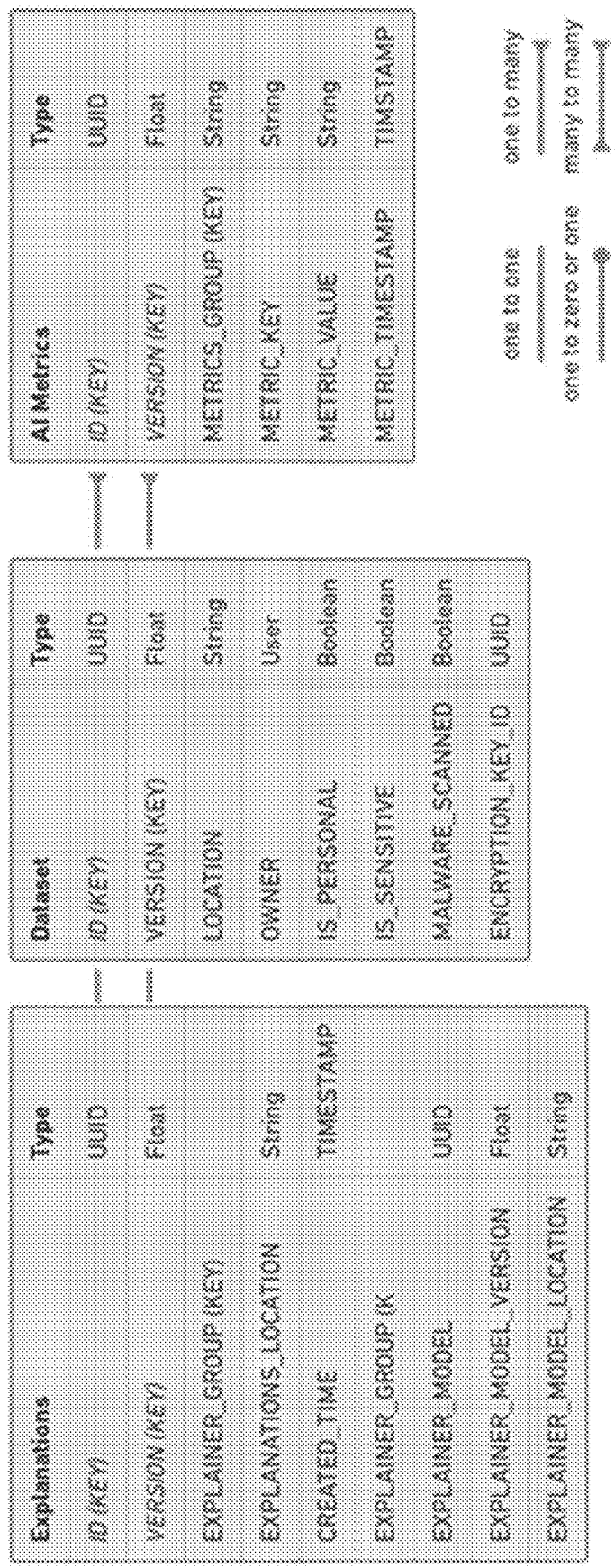
FIG. 3 depicts an entity-relationship diagram illustrating an example of a data model for storing model explainability data, in accordance with some example embodiments.

Metadata associated with the one or more model explanations 175 may be stored, for example, in a table in a persistence layer. FIG. 3 depicts an entity-relationship diagram 300 illustrating an example of a data model for storing the one or more model explanations 175, in accordance with some example embodiments. In some cases, FIG. 3 shows that the one or more model explanations 175 may be associated with an EXPLANATIONS_LOCATION, which points to a location in the data store 130 at which the one or more model explanations 175 are stored in an open format and in a standardized model format (e.g., Python model, Scikit learn model, Tensorflow model, Pytorch model, Kserve model, Seldon model, Keras model, and/or the like). Furthermore, FIG. 3 shows that EXPLAINER_MODEL and EXPLAINER_MODEL_VERSION may also be stored as metadata in the data store 170 with a one-to-one mapping with the training dataset table.

In some example embodiments, the digital assistant platform 110, for example, the performance controller 115 may also store, at the data store 130, statistics and distributions associated with the training data used to train the machine learning model 135. When the machine learning model 135 is deployed to perform one or more natural language processing tasks (e.g., entity recognition, intent classification, skill resolution and execution, and/or the like), the second microservice 120b may use at least a portion of this data during runtime to detect, for example, data drift, data bias, and/or outliers in the data encountered by the machine learning model 135. Referring again to FIG. 3, METRICS_GROUP may include a variety of performance metrics associated with the machine learning model 135 including, for example, accuracy, recall, precision, and/or the like. In cases where the second microservice 120b of the performance controller 110 detects bias in the data encountered by the machine learning model 135 in deployment, the performance controller 115 may update a bias metrics in the metrics table in the data store 130 as 'BIAS' under the METRICS_GROUP. Meanwhile, the METRIC_KEY shown in FIG. 3 may include a metric name and while the corresponding values are included as METRIC_VALUE. In some cases, METRIC_VALUE may be a single value, an array of values, a JSON formatted string, and/or the like. The values included as METRIC_TIMESTAMP may be used to understand how a corresponding metric has evolved over time.

When the machine learning model 135 is deployed to a server hosting the digital assistant 130, the performance controller 110 may also deploy, to the server hosting the digital assistant 130, the first microservice 120a including the one or more explanation models. For example, in some cases, the one or more explanation models may be deployed by at least updating the model serving templates to include an explainer section along with a predictor section. As will be explained in more detail below, in some cases, the performance controller 110 may also deploy, to the server hosting the digital assistant 130, the second microservice 120b providing the detection of data drift, data bias, and outliers.

Table 1 below depicts an example of programming code for deploying the machine learning model 135 and the one or more explanation models implementing the first microservice 120a for model explainability and interpretability.

TABLE 1

```
spec:
  default:
    predictor:
      minReplicas: 1
      sklearn:
        storageUri: "gs://seldon-models/po_model/English/predict/"
        resources:
          requests:
            cpu: 1
    explainer:
      minReplicas: 1
      alibi:
        type: AnchorText
        storageUri: "gs://seldon-models/po_model/english/explain"
        resources:
          requests:
            cpu: 1
```

Figure 2B:
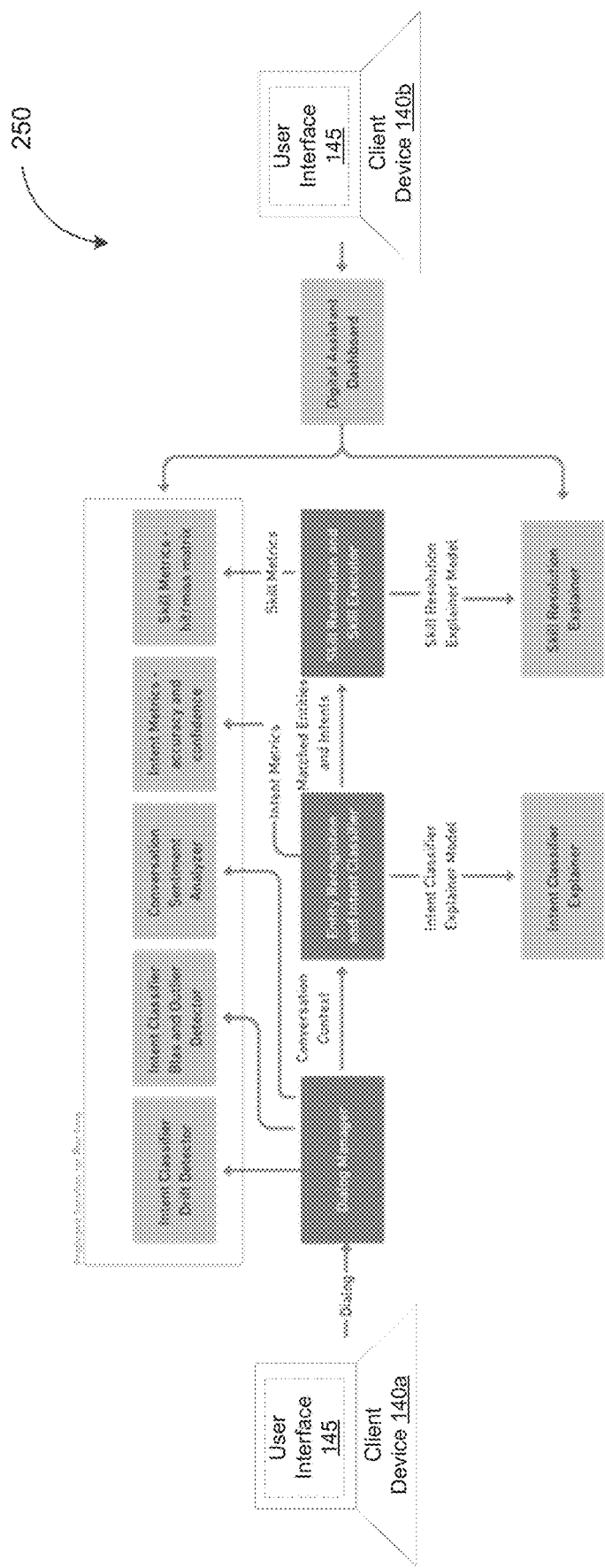
FIG. 2B depicts a schematic diagram illustrating another example of a digital assistant lifecycle management workflow, in accordance with some example embodiments.

FIG. 2B depicts a schematic diagram illustrating another example of a digital assistant lifecycle management workflow 250, in accordance with some example embodiments. In some example embodiments, the performance controller 115 may perform the digital assistant lifecycle management workflow 250 once the digital assistant 130 has been deployed, for example, to the server hosting the digital assistant 130. In the example shown in FIG. 2B, once the digital assistant 130 is deployed, the user 160 at the client device 140a may interact with the digital assistant 130 via a dialog manager 252, which handles various application programming interface (API) gateway security features, user authentication, and user authorization. The dialog manager 252 may receive, from the client device 140a, one or more user inputs corresponding to a conversation initiated by the user 160 at the client device 140a. In some cases, the dialog manager 252 may handle the lifecycle of the conversation, which may include assigning a conversation identifier, creating a conversation context, and continuously enriching the conversation context during the lifecycle of the conversation until the end of the conversation. Examples of conversation context may include conversation history, user information, bot metadata, dialog history, entities, and intents. In some cases, the conversation context may also include a quality section, which holds various performance metrics associated with the current conversation including local model explanations, data characteristics (e.g., data drift, data bias, and outliers), intent prediction metrics, and skill prediction metrics.

Table 2 below depicts various examples of information included as a part of the conversation context of a conversation.

TABLE 2

Figure 4A:
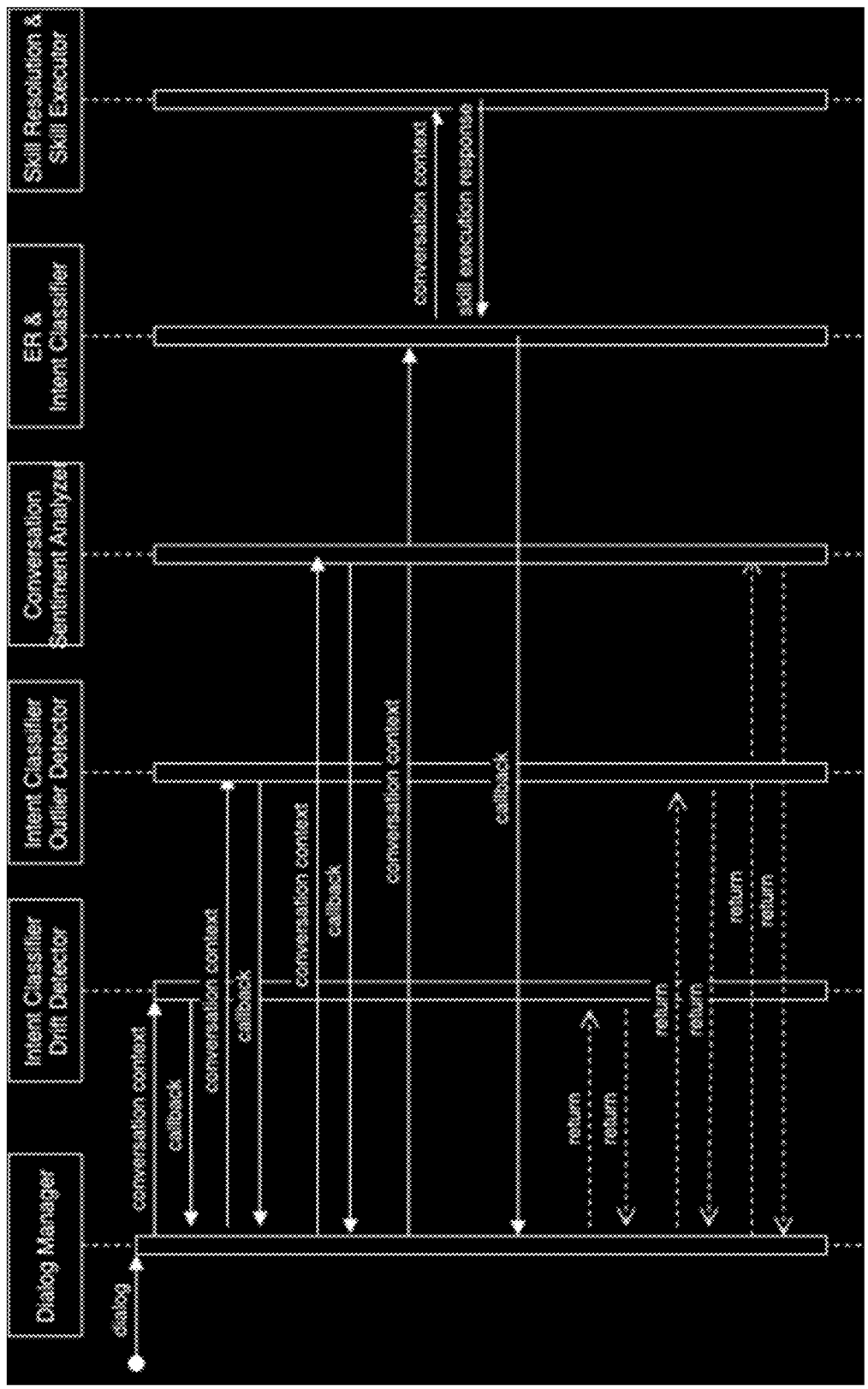
FIG. 4A depicts a sequence diagram illustrating an example of a process for a performance controller for a machine learning based digital assistant, in accordance with some example embodiments.

Conversation Context
    Conversation
        Id
        language
        Skill stack
        Memory
        Initial context
    Conversation Quality
        Conversation steps
            Step info
            Explanations
            DataDriftDetection
            OutlierDetection
            BiasDetection
            IntentMetrics
            SkillMetrics
            Sentiment
    Messages
    ConversationState
    Request Logs
    Disambiguation
    Client Context
        User JWT / resource JWT
        Client-info
        Participant data FIG. 4A depicts a sequence diagram illustrating an example of a process 400 for the performance controller 115 for the machine learning model 135 implementing the digital assistant 130, in accordance with some example embodiments. As shown in FIG. 4A, the dialog manager 252 may respond to receiving a dialog initiated, for example, by the user 160 at the client device 140a, by performing a lookup and fetching the metadata associated with the digital assistant 130 based on the digital assistant identifier and version. This metadata may include, for example, the uniform resource locator (URL) of the first microservice 120a and the second microservice 120b performing model explanations and the detection of data drift, data bias, and outliers as well as that of other microservices for storing performance metrics and monitoring and conversation sentiment analysis.

In the example shown in FIG. 4A, the dialog manager 252 may orchestrate the incremental enrichment of the conversation context including by interacting with the intent classifier drift detector 258, the intent classifier outlier detector 260, the sentiment analyser 262, the entity recognition intent classifier 254, and the skill resolution and executor 256 to update, for example, the quality section of the conversation context (e.g., performance metrics associated with the current conversation including local model explanations, data characteristics (e.g., data drift, data bias, and outliers), intent prediction metrics, and skill prediction metrics). For example, in some cases, the conversation context may be passed asynchronously to the intent classification drift detector 258, which then returns the result of drift detection to the dialog manager 252 as well as stores at least a portion of these results in the data store 130. As shown in FIG. 4A, the conversation context may also be passed asynchronously to the intent classification bias & outlier detector 260, which returns the results of bias and outlier detection back to the dialog manager 252 as well as stores at least a portion of the results in the data store 130. Moreover, in some cases, FIG. 4A shows that the conversation context may be passed asynchronously to the conversation sentiment analyser 262, which returns the results of sentiment analysis back to the dialog manager 252 as well as stores at least a portion of the results in the data store 130.

Figure 4B:
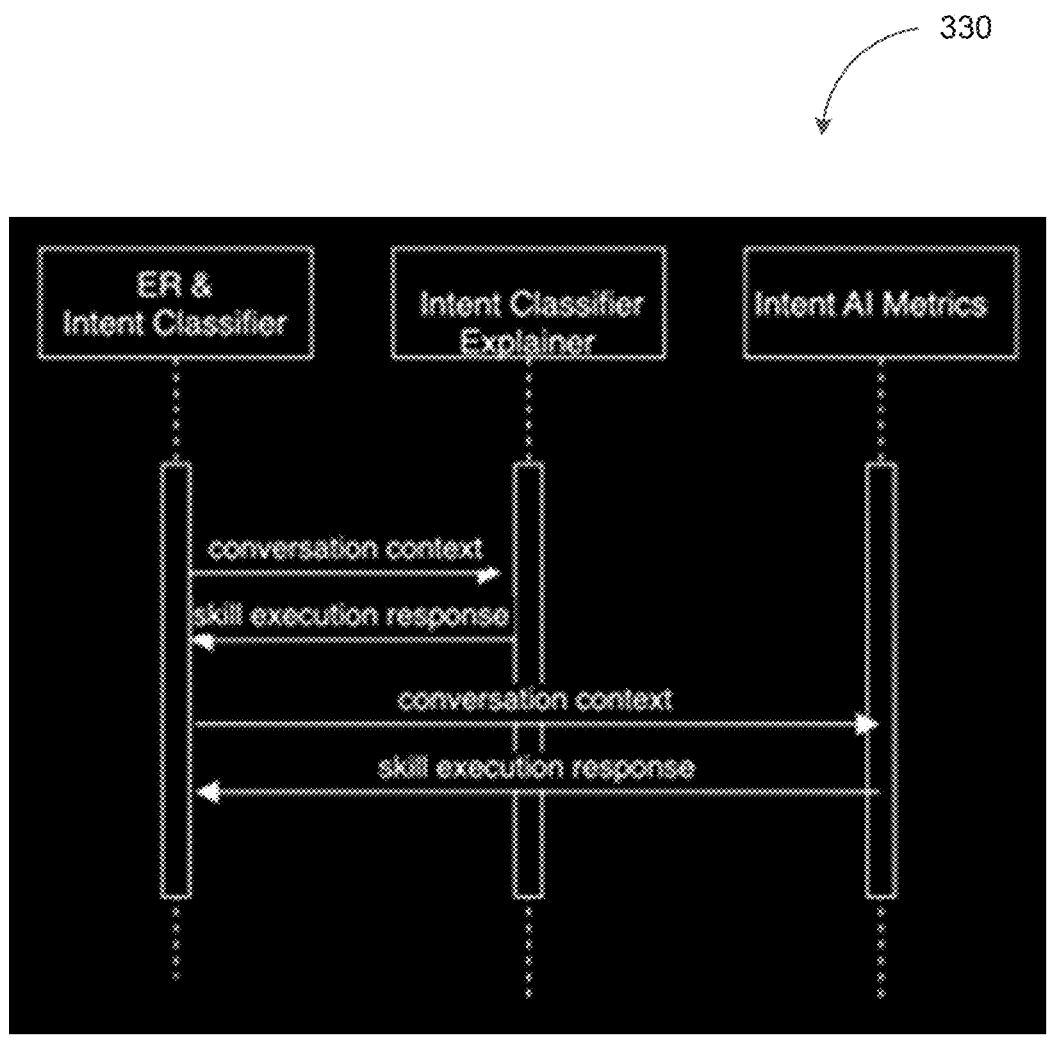
FIG. 4B depicts a sequence diagram illustrating another example of a process for a performance controller for a machine learning based digital assistant, in accordance with some example embodiments.

Referring now to FIG. 4B, which depicts a sequence diagram illustrating another example of a process 425 for the performance controller 115 of the machine learning model 135 implementing the digital assistant 130. In the example shown in FIG. 4B, conversation context may be passed asynchronously from the dialog manager 252 to the entity recognition and intent classifier 254, which then calls the machine learning model 135 to classify the intent of the natural language commands included in the dialog. In parallel to the prediction request, the entity recognition and intent classifier 254 may also call the intent classifier explainer model 268 and the corresponding intent explanation results may be stored as a part of the model explanations 175 (e.g., in an explanations table) at the data store 170 under the EXPLANATION_GROUP as "intent". The results of intent classifier explanations may also be returned as a response to the dialog manager 252. Once the prediction results are obtained from the machine learning model 135, the entity recognition and intent classifier 254 may call the intent metrics server asynchronously to store various performance metrics for monitoring (e.g., prediction time, explanation time, accuracy, precision, recall, and/or the like).

Table 3 below depicts examples of the calls made to the machine learning model 135 and the intent classifier explainer model 268.

TABLE 3 curl -v -H "Host: po_model.default.sap.com"
http://$CLUSTER_IP/v1/models/$MODEL_NAME:predict -d
'{"instances":["status of purchase order 123"]}'
curl -v -H "Host: po_model.default.sap.com"
http://$CLUSTER_IP/v1/models/$MODEL_NAME:explain -d
'{"instances":["status of purchase order 123"]}'

In some example embodiments, the intent classifier explainer model 268 may provide explanations and interpretability of the machine learning model 135 implementing entity recognition and intent classifier 254 in a variety of ways including, for example, using integrated gradients, anchors, similarity explanations. For example, in some cases, the various explanation models may use prominence or feature importance methods, such as gradient-based, anchor-based, or similarity-based methods, for the explanations how the machine learning model 135 arrives at its intent classification for various text-based inputs. In the case of explanations using integrated gradients, the intent classifier explainer model 268 may provide an attribution value for each word of user input corresponding to the predicted intent. Words with high positive attribution are highlighted in shades of a first color and words with negative attribution in shades of a second color. Stronger shading corresponds to higher attribution values. Positive attributions can be interpreted as increase in probability of the predicted class while negative attributions correspond to decrease in probability of the predicted class. In the case of explanations using anchors, an unknown sampling strategy may be used in which expressions are perturbed by replacing words with an unknown string (e.g., UNK). With explanations using similarity explanations, the aim may be to identify expressions in the training set that are similar to a user input according to a similarity metric.

In some example embodiments, where multiple explanation models are used to provide an explanation for the output of the machine learning model 135, the performance controller 115 may apply one or more ensembling techniques, such as bagging, stacking, and boosting, to aggregate the results of the explanation models.

Figure 4C:
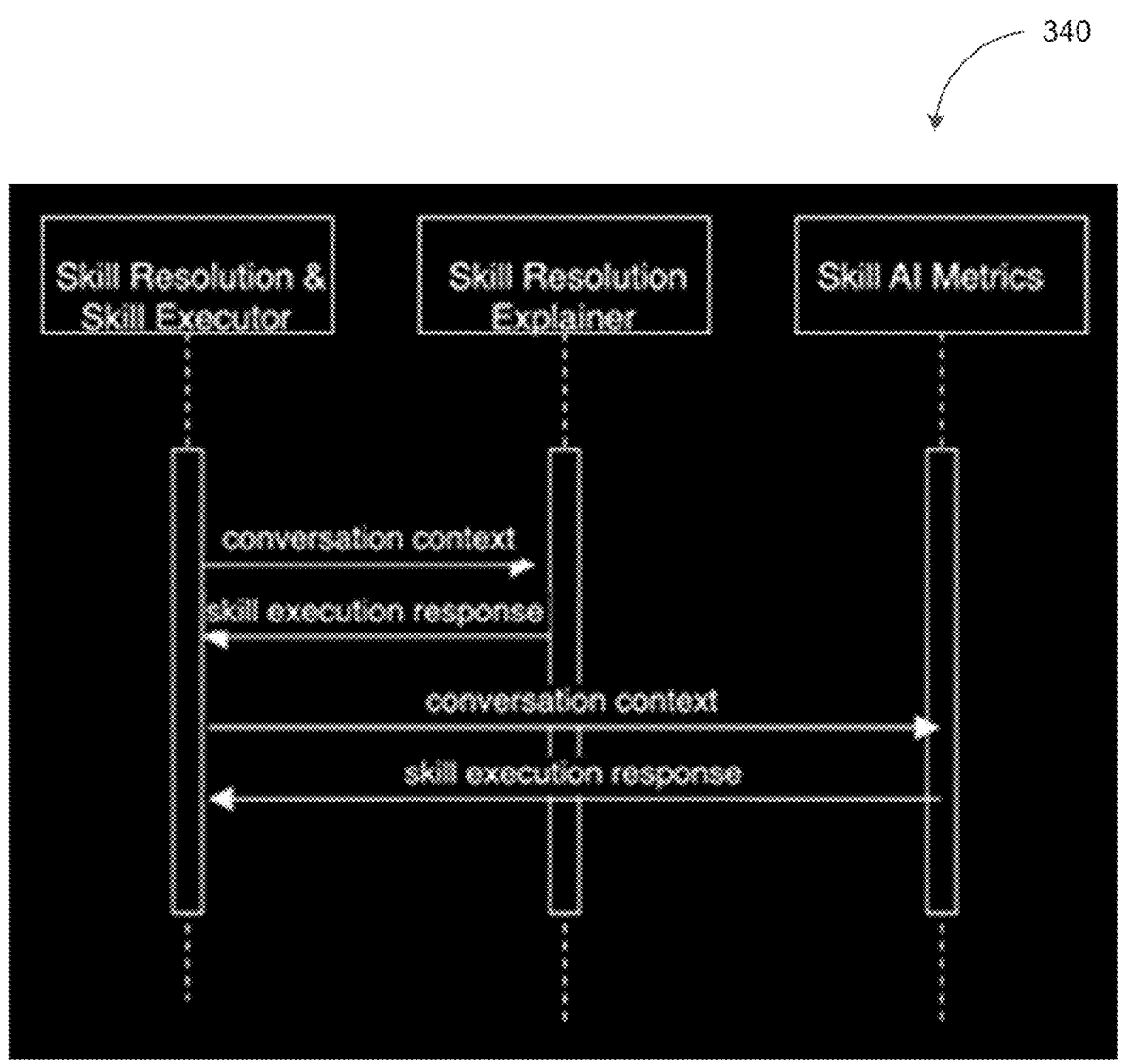
FIG. 4C depicts a sequence diagram illustrating another example of a process for a performance controller for a machine learning based digital assistant, in accordance with some example embodiments.

Referring now to FIG. 4C, which depicts a sequence diagram another example of a process 450 for the performance controller 115 of the machine learning model 135 implementing the digital assistant 130. In the example shown in FIG. 4C, conversation context may be passed synchronously from the entity recognition and intent classifier 254 to the skill detection and executor 256. In parallel to skill execution, a call to the skill resolution explainer model 270 may be triggered and the skill explanation results are stored as a part of the model explanations 175 (e.g., in an explanations table) in the data store 130, for example, under the EXPLANATION_GROUP as "skills". Skill explanation results may also be returned as a response to the dialog manager 252. Once the skill execution actions are performed by the skill detection and executor 256, a call to the skill metrics server may be triggered asynchronously to store various performance metrics for monitoring (e.g., primary conditions, secondary conditions, execution time per action, and/or the like).

Referring again to FIG. 2B, the digital assistant platform 110 may be associated with a digital assistant dashboard 272. An administrative user, for example, at the client device 140b may interact with the digital assistant platform 110 via the digital assistant dashboard 272. For example, key insights captured and stored during the development and deployment of the machine learning model 135 implementing the digital assistant 130 may be stored in the data store 130 for further analysis. In some cases, the digital assistant dashboard 272 may provide a visualization (e.g., graphs, charts, and/or the like) of at least a portion of these insights, thus enabling an understanding and drill down of the behaviour of the machine learning model 135 implementing the digital assistant 130 in the production environment of the digital assistant 130. The digital assistant dashboard 272 may support this analysis even when the digital assistant 130 is not in an active status or after the digital assistant 130 has been decommissioned. In doing so, the digital assistant dashboard 272 may provide traceability and comparative analysis across different versions of the digital assistant 130.

Figure 5:
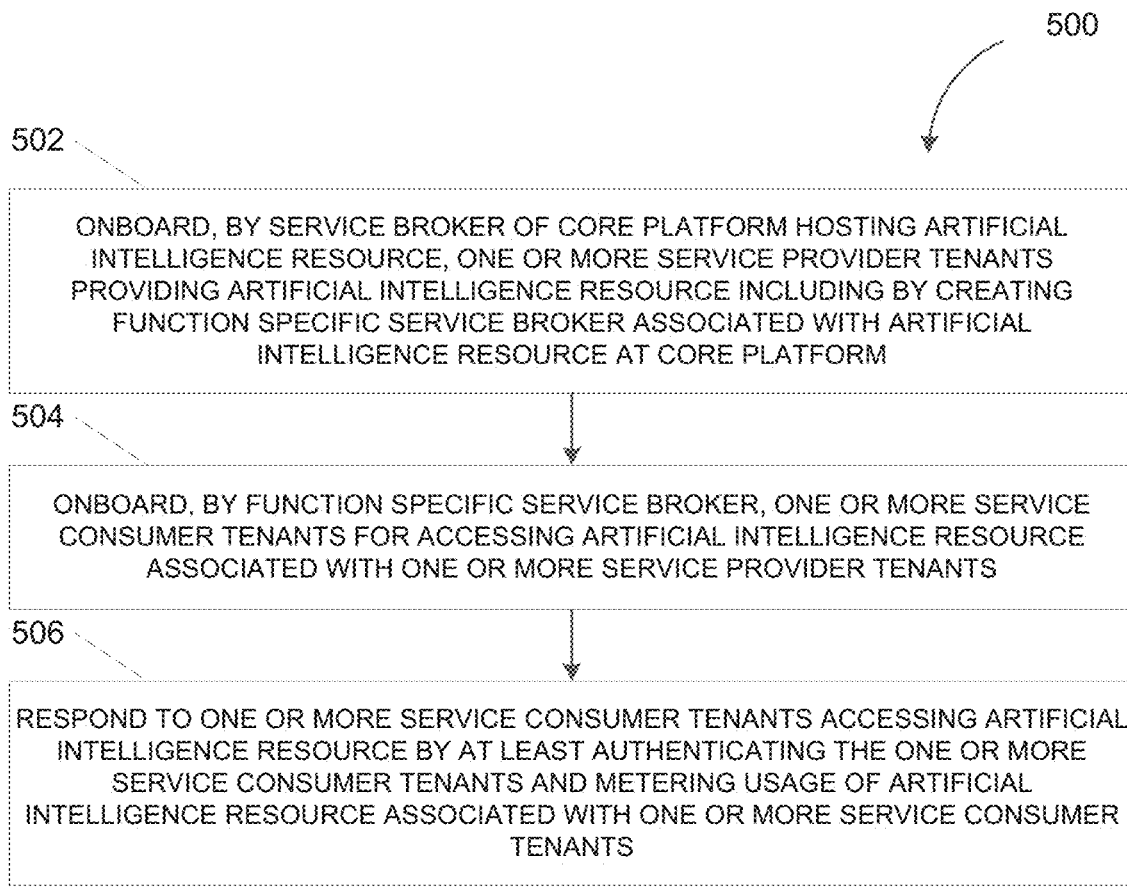
FIG. 5 depicts a flowchart illustrating an example of a process for a performance controller for a machine learning model based digital assistant, in accordance with some example embodiments.

FIG. 5 depicts a flowchart illustrating an example of a process 500 for the performance controller 115 of the machine learning model 135 implementing the digital assistant 130, in accordance with some example embodiments. In some example embodiments, the process 500 may implement at least a portion of an end-to-end lifecycle management workflow performed by the digital assistant platform 110 including, for example, the performance controller 115.

At 502, the digital assistant platform 110 may train, based at least on a first data, a machine learning model to perform one or more natural language processing tasks. For example, in some example embodiments, the digital assistant platform 110 may train, based at least on a training dataset, the machine learning model 135 to perform one or more natural language process tasks. Examples of natural language processing tasks may include entity recognition, intent classification, skill resolution and execution, and/or the like.

At 504, the digital assistant platform 110 may deploy, to a production environment, the trained machine learning model to support natural language based interactions with a digital assistant. In some example embodiments, the digital assistant platform 110 may deploy, to a production environment, the trained machine learning model 135 to support natural language based interactions with the digital assistant 130. For example, in some cases, the user 160 at the client device 140 may interact with the one or more enterprise software applications 145 via one or more natural language commands provided as text inputs, voice commands, and/or the like. The digital assistant 130 in this case may perform the one or more natural language processing tasks, such as entity recognition, intent classification, skill resolution and execution, and/or the like, in order to process the one or more natural language commands and trigger the corresponding data processing functionalities of the enterprise software applications 145.

At 506, the digital assistant platform 110 may generate a plurality of performance metrics to include an explanation data associated with the deployed machine learning model operating on a second data. In some example embodiments, the digital assistant platform 110 may include the performance controller 115, which provides at least the first microservice 120a with one or more explanation models providing various model interpretability or explainability data, which may include identifying a top k quantity of variables contributing to an output of the machine learning model 135 performing one or more domain-specific natural language processing tasks such as entity recognition, intent classification, and skill resolution and execution. Examples of explanation models include integrated gradients explanation models, anchors explanation models, and similarity explanation models. In cases where the performance controller 115 applies multiple explanation models, may apply one or more ensembling techniques, such as bagging, stacking, and boosting, to aggregate the results of the explanation models to form, for example, the explanation data 175 stored at the data store 170.

At 508, the digital assistant platform 110 may generate the plurality of performance metrics to include one or more data characteristics of the second data. In some example embodiments, the digital assistant platform 110 may further generate the plurality of performance metrics to include one or more characteristics of the second data encountered by the trained machine learning model 135 deployed at the production environment. Examples of data characteristics include data bias (e.g., a bias towards certain classes in the first data used to train the machine learning model 135 and/or the second data), data drift (e.g., the second data deviating from the first data used to train the machine learning model 135), and outliers (e.g., the second data falling outside of the distribution of the first data used to train the machine learning model 135).

At 510, the digital assistant platform 110 may generate a user interface to display, at client device, a visual representation of at least a portion of the plurality of performance metrics associated with the deployed machine learning model. In some example embodiments, the digital assistant platform 110 may be associated with the digital assistant dashboard 272, which may be displayed as a part of a user interface 274 at the client device 140b of an administrative user of the digital assistant platform 110. In some cases, the digital assistant dashboard 272 may provide a visualization (e.g., graphs, charts, and/or the like) of at least a portion of the explanation data 175 and/or the data characteristics captured by the performance controller 110.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: training, based at least on a first data, a machine learning model to perform one or more natural language processing tasks; deploying, to a production environment, the trained machine learning model to support natural language based interactions with a digital assistant; generating a plurality of performance metrics to include explanation data associated with the deployed machine learning model operating on a second data, the explanation data being generated by applying a plurality of explanation models and ensembling an output of each of the plurality of explanation models; and generating a user interface to display, at a client device, a visual representation of at least a portion of the plurality of performance metrics associated with the deployed machine learning model.

Example 2: The system of Example 1, wherein the plurality of explanation models include an integrated gradients explanation model, an anchors explanation model, and/or a similarity explanation model.

Example 3: The system of any of Examples 1 to 2, wherein the output of each of the plurality of explanation models are ensembled by applying one or more of a bagging ensembling technique, a stacking ensembling technique, and a boosting ensembling technique.

Example 4: The system of any of Examples 1 to 3, wherein the operations further comprise: generating the plurality of performance metrics to include one or more data characteristics of the second data.

Example 5: The system of Example 4, wherein the one or more data characteristics include a data bias in which the first data and/or the second data exhibits a bias towards one or more classes.

Example 6: The system of any of Examples 4 to 5, wherein the one or more data characteristics include a data drift in which the second data deviates from the first data.

Example 7: The system of any of Examples 4 to 6, wherein the one or more data characteristics include at least one outlier in which the second data falls outside of a distribution of the first data.

Example 8: The system of any of Examples 1 to 7, wherein the one or more natural language processing tasks include entity recognition, intent classification, and skill resolution and execution.

Example 9: The system of any of Examples 1 to 8, wherein the trained machine learning model is deployed to process one or more natural language commands received by the digital assistant.

Example 10: The system of Example 9, wherein the one or more natural language commands invoke at least one data processing functionality of an enterprise software application associated with the digital assistant.

Example 11: The system of Example 10, wherein the at least one data processing functionality is associated with at least one enterprise workflow comprising billing, invoicing, procurement, payroll, time and attendance management, recruiting and onboarding, learning and development, performance and compensation, and/or workforce planning.

Example 12: A computer-implemented method, comprising: training, based at least on a first data, a machine learning model to perform one or more natural language processing tasks; deploying, to a production environment, the trained machine learning model to support natural language based interactions with a digital assistant; generating a plurality of performance metrics to include explanation data associated with the deployed machine learning model operating on a second data, the explanation data being generated by applying a plurality of explanation models and ensembling an output of each of the plurality of explanation models; and generating a user interface to display, at a client device, a visual representation of at least a portion of the plurality of performance metrics associated with the deployed machine learning model.

Example 13: The method of Example 12, wherein the plurality of explanation models include an integrated gradients explanation model, an anchors explanation model, and/or a similarity explanation model.

Example 14: The method of any of Examples 12 to 13, wherein the output of each of the plurality of explanation models are ensembled by applying one or more of a bagging ensembling technique, a stacking ensembling technique, and a boosting ensembling technique.

Example 15: The method of any of Examples 12 to 14, further comprising: generating the plurality of performance metrics to include one or more data characteristics of the second data.

Example 16: The method of Example 15, wherein the one or more data characteristics include a data bias in which the first data and/or the second data exhibits a bias towards one or more classes.

Example 17: The method of any of Examples 15 to 16, wherein the one or more data characteristics include a data drift in which the second data deviates from the first data.

Example 18: The method of any of Examples 15 to 17, wherein the one or more data characteristics include at least one outlier in which the second data falls outside of a distribution of the first data.

Example 19: The method of any of Examples 12 to 18, wherein the trained machine learning model is deployed to process one or more natural language commands received by the digital assistant, and wherein the one or more natural language commands invoke at least one data processing functionality of an enterprise software application associated with the digital assistant.

Example 20: A non-transitory computer readable medium storing instructions, which when executed by at least one data processor, result in operations comprising: training, based at least on a first data, a machine learning model to perform one or more natural language processing tasks; deploying, to a production environment, the trained machine learning model to support natural language based interactions with a digital assistant; generating a plurality of performance metrics to include explanation data associated with the deployed machine learning model operating on a second data, the explanation data being generated by applying a plurality of explanation models and ensembling an output of each of the plurality of explanation models; and generating a user interface to display, at a client device, a visual representation of at least a portion of the plurality of performance metrics associated with the deployed machine learning model.

FIG. 6 depicts a block diagram illustrating a computing system 600, in accordance with some example embodiments. Referring to FIGS. 1-6, the computing system 600 can be used to implement the digital assistant platform 110 and/or any components therein.

As shown in FIG. 6, the computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more components of, for example, the digital assistant platform 110. In some implementations of the current subject matter, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a floppy disk device, a hard disk device, an optical disk device, or a tape device, or other suitable persistent storage means. The input/output device 640 provides input/output operations for the computing system 600. In some implementations of the current subject matter, the input/output device 640 includes a keyboard and/or pointing device. In various implementations, the input/output device 640 includes a display unit for displaying graphical user interfaces.

According to some implementations of the current subject matter, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some implementations of the current subject matter, the computing system 600 can be used to execute various interactive computer software applications that can be used for organization, analysis and/or storage of data in various (e.g., tabular) format (e.g., Microsoft Excel®, and/or any other type of software). Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 640. The user interface can be generated and presented to a user by the computing system 600 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions which, when executed by the at least one data processor, result in operations comprising:
   training, based at least on a first data, a machine learning model to perform one or more natural language processing tasks;
   deploying, to a production environment, the trained machine learning model to support natural language based interactions with a digital assistant and to process one or more natural language commands received by the digital assistant, wherein the one or more natural language commands invoke at least one data processing functionality of an enterprise software application associated with the digital assistant;
   generating a plurality of performance metrics to include explanation data associated with the deployed machine learning model operating on a second data and one or more data characteristics of the second data, the explanation data being generated by applying a plurality of explanation models and ensembling an output of each of the plurality of explanation models; and
   generating a user interface to display, at a client device, a visual representation of at least a portion of the plurality of performance metrics associated with the deployed machine learning model.

2. The system of claim 1, wherein the plurality of explanation models include an integrated gradients explanation model, an anchors explanation model, and/or a similarity explanation model.

3. The system of claim 1, wherein the output of each of the plurality of explanation models are ensembled by applying one or more of a bagging ensembling technique, a stacking ensembling technique, and a boosting ensembling technique.

4. The system of claim 1, wherein the one or more data characteristics include a data bias in which the first data and/or the second data exhibits a bias towards one or more classes.

5. The system of claim 1, wherein the one or more data characteristics include a data drift in which the second data deviates from the first data.

6. The system of claim 1, wherein the one or more data characteristics include at least one outlier in which the second data falls outside of a distribution of the first data.

7. The system of claim 1, wherein the one or more natural language processing tasks include entity recognition, intent classification, and skill resolution and execution.

8. The system of claim 1, wherein the at least one data processing functionality is associated with at least one enterprise workflow comprising billing, invoicing, procurement, payroll, time and attendance management, recruiting and onboarding, learning and development, performance and compensation, and/or workforce planning.

9. A computer-implemented method, comprising:
- training, based at least on a first data, a machine learning model to perform one or more natural language processing tasks;
- deploying, to a production environment, the trained machine learning model to support natural language based interactions with a digital assistant and to process one or more natural language commands received by the digital assistant, wherein the one or more natural language commands invoke at least one data processing functionality of an enterprise software application associated with the digital assistant;
- generating a plurality of performance metrics to include explanation data associated with the deployed machine learning model operating on a second data and one or more data characteristics of the second data, the explanation data being generated by applying a plurality of explanation models and ensembling an output of each of the plurality of explanation models; and
- generating a user interface to display, at a client device, a visual representation of at least a portion of the plurality of performance metrics associated with the deployed machine learning model.

10. The method of claim 9, wherein the plurality of explanation models include an integrated gradients explanation model, an anchors explanation model, and/or a similarity explanation model.

11. The method of claim 9, wherein the output of each of the plurality of explanation models are ensembled by applying one or more of a bagging ensembling technique, a stacking ensembling technique, and a boosting ensembling technique.

12. The method of claim 9, wherein the one or more data characteristics include a data bias in which the first data and/or the second data exhibits a bias towards one or more classes.

13. The method of claim 9, wherein the one or more data characteristics include a data drift in which the second data deviates from the first data.

14. The method of claim 9, wherein the one or more data characteristics include at least one outlier in which the second data falls outside of a distribution of the first data.

15. A non-transitory computer readable medium storing instructions, which when executed by at least one data processor, result in operations comprising:
- training, based at least on a first data, a machine learning model to perform one or more natural language processing tasks;
- deploying, to a production environment, the trained machine learning model to support natural language based interactions with a digital assistant and to process one or more natural language commands received by the digital assistant, wherein the one or more natural language commands invoke at least one data processing functionality of an enterprise software application associated with the digital assistant;
- generating a plurality of performance metrics to include explanation data associated with the deployed machine learning model operating on a second data and one or more data characteristics of the second data, the explanation data being generated by applying a plurality of explanation models and ensembling an output of each of the plurality of explanation models; and
- generating a user interface to display, at a client device, a visual representation of at least a portion of the plurality of performance metrics associated with the deployed machine learning model.

* * * * *